June 19, 1962    J. E. OWENS    3,040,244
THYRATRON ANTICIPATORY FAILURE DETECTION
Filed Aug. 5, 1959
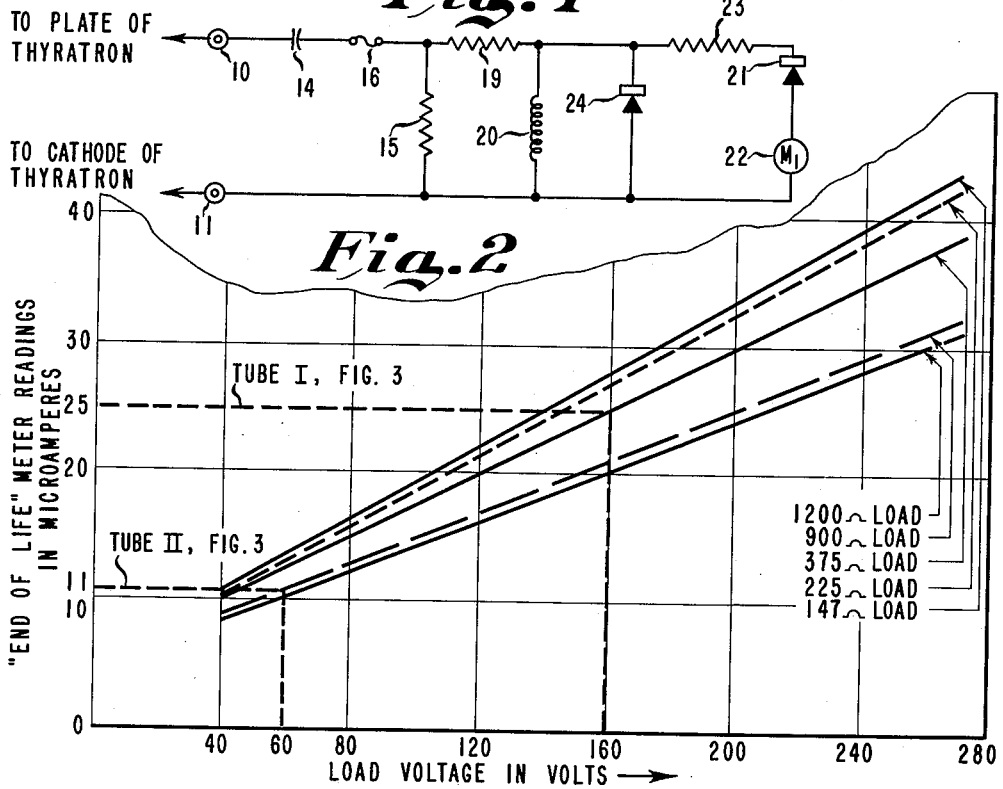
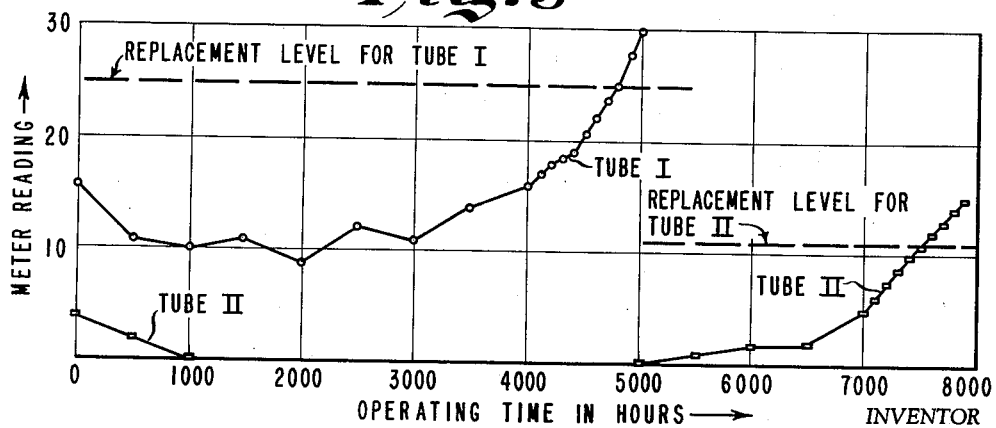
INVENTOR
JOHN E. OWENS
BY Harry J. McCauley
ATTORNEY 3,040,244
THYRATRON ANTICIPATORY FAILURE
DETECTION
John E. Owens, Wilmington, Del., assignor to E. I. du
Pont de Nemours and Company, Wilmington, Del., a
corporation of Delaware
Filed Aug. 5, 1959, Ser. No. 831,888
4 Claims. (Cl. 324—24)

This invention relates to a method and apparatus for anticipatory failure detection in thyratron tubes, and particularly to a method and apparatus which is independent of the principal circuit which the thyratron tube is serving, so that the anticipatory failure detection function is accomplished without interfering in any manner with the conventional operation of the thyratron.

Thyratron tubes have an exceedingly broad field of use in industry and the arts, a typical example being the control of very large current flows, as in the operation of motor power systems and the like. Usually, continuity of operation in thyratron applications is exceedingly important, because materials in process can be deleteriously affected by sudden power failures as to which no advance preparation can be made. This invention provides a method and means for the anticipatory detection of thyratron tube failure long before it ever occurs, so that appropriate action, such as the substitution of a new tube, may be taken during scheduled maintenance shutdowns rather than on an emergency basis.

Previously, it has not been possible to conveniently determine during service the impending failure occasioned by the approaching end of the functioning life of a thyratron, although attempts have been made to approximate such determinations on the basis of secondary effects, such as a rise in ambient temperature or the like. Abnormal rise in temperature with tube deterioration is not a consistent phenomenon upon which to base tube life appraisal and, moreover, difficulties in the precise detection of temperature rise, the disturbing effects of outside environment, and other considerations make this test unsatisfactory. I have now discovered a primary phenomenon inherent in the operation of thyratrons themselves which is directly correlated with tube operating life and, therefore, is absolutely trustworthy for the objectives sought. This is the discovery that, as the thyratron nears the end of its useful life, there is eventually generated a small, high frequency, alternating voltage between the plate and the cathode which has a frequency somewhere in the range of approximately 100 kilocycles/sec. to 5 megacycles/sec., this frequency depending on the particular type of tube involved, which is superimposed on the normal conduction current of the tube. Moreover, I have discovered that the magnitude and trend of this high frequency voltage is related to the existing condition of the thyratron tube and is definitely an index of the remaining useful life of the device.

The nature of this invention will become apparent from the following detailed description and the drawings, in which:

FIG. 1 is a partially schematic circuit diagram of a preferred embodiment of the apparatus of this invention as applied to a type 3C23 thyratron having Hg vapor as the gas phase, to which some xenon is added to facilitate startup, FIG. 2 is a plot of "end of life" instrument meter readings in microamperes v. load voltages for five typical loads ranging from 147 ohms to 1200 ohms for a type 3C23 thyratron, the recommended replacement points for the two specific tubes, I and II of FIG. 3, being indicated, and FIG. 3 is a plot of meter readings in microamperes v. operating time in hours over substantially the entire operating lives of two type 3C23 thyratrons, tube I of which is operated in typically normal service with a load of 160 volts and 375 ohms while tube II is operated below rated capacity at 60 volts and 900 ohms.

Generally, this invention comprises a method and apparatus for assessing the remaining life of thyratron tubes from the standpoint of their normal functioning with respect to the depletion of their cathode electron-emitting surfaces as a function of the measured voltage value of the plasma-ion oscillation existing within the tube and the trend of the magnitudes of these oscillations over an appreciable time interval.

At the outset, it should be recognized that there is a difference in the nature of plasma-ion oscillations as distinguished from relaxation oscillations. The plasma-ion type is internal to the tube and is, therefore, not affected nearly as much by circuit parameters, such as the resistance or capacitance in the plate-cathode circuit, or the like. In contradistinction, relaxation frequencies are highly dependent upon external circuit characteristics and conditions in a manner well known in the art.

The exact causes of plasma-ion oscillation are not well understood; however, it appears that, after an initial break-in period, the electron-emitting surfaces of the cathode are gradually dissipated to the point where an ever-increasing number of positive ions traverse the space charge adjacent to the cathode and impinge thereon to cause secondary electron emission. These electrons bombard molecules of the gas filling within the tube with resulting ionization and, as a result, voltage oscillations occur which have been designated as being of the "plasma-ion" type because of their occurrence within this general region of the tube. There is almost invariably a measurable voltage resulting from plasma-ion oscillation during the entire life of the thyratron tube. The rare exception in practice is where there exists a relatively high load resistance and low load voltage, under which circumstances plasma-ion oscillation may still occur, but at such a low voltage level as to make measurement difficult.

After extensive investigation, I have found that this voltage steadily increases in magnitude towards the end of life of the tube and, above a certain danger level, it is advisable that the thyratron tube be replaced during the next scheduled shutdown of the particular machine if continuity of operation is to be preserved. I have found that the danger level at which a given thyratron tube can be considered unreliable corresponds very closely to the disintegration level" of the arc drop voltage which the art has hitherto relied upon as the criterion of failure, although such tests have required that the particular tube be taken out of service until the arc drop could be determined. It is this disadvantage which my invention is primarily intended to overcome. On the basis of arc drop voltage tests which have been made upon a large number of thyratron tubes, it is known to the prior art that the functioning life of the tube is rapidly brought to an end when the peak arc drop voltage passes the critical level denoted the "disintegration level," because positive ions then attain accelerations so high that they seriously erode the cathode by their bombardment action. Accordingly, it is conservative prior art practice, as well as the practice of this invention, to substitute a new thyratron for the one in service when the peak arc drop reaches or exceeds this disintegration level. As a typical example, the disintegration level for a 3C23 type thyratron is normally 25 volts.

Referring to FIG. 1, this invention will be described with particular application to type 3C23 mercury vapor-xenon combination filled thyratron tubes. With this type of thyratron, the plasma-ion oscillation of interest has been found to be in the $200 \pm 100$ kc. frequency range under rather extreme operating conditions, such as in situations where there is a marked departure from the tube manufacturer's specifications of operation as regards environmental temperature, filament or plate voltages, or the like. Sometimes, also, the frequency depends appreciably on the gas density existing within a given tube, and, as to this, manufacturer's design standards allow quite a considerable range of variation. Under generally normal conditions, however, the plasma-ion oscillation will usually fall in the narrower range of 200±20 kc./sec.

My apparatus consists of a passive network terminating in the two pin jacks 10 and 11 which are, respectively, adapted to be connected to the plate and cathode elements of the thyratron to be tested. A low-frequency blocking filter is provided to bar the entrance of the principal current and voltage which passes through the thyratron in service and, for 60 cycle alternating current, this is conveniently achieved by the use of a capacitor 14 of 0.003 mfd. size connected with a resistor 15 of 820 ohms size. A 1/16 ampere fuse 16 is preferably interposed past capacitor 14 as a protection for the subsequent circuitry.

Resistor 19 (typically 1200 ohms) together with inductance 20 (typically 1 millihenry) constitute a band pass filter operative to pass frequencies in the range of about 180–220 kc./sec., corresponding to the generally normal operating conditions hereinbefore described, while barring passage of any of the primary low frequency current which traverses the thyratron and may not have been completely removed by the filter network consisting of capacitor 14 and resistor 15. Inductance 20 constitutes an RF choke which is parallel resonant at 200 kc./sec., but broadly tuned because of its associated high D.-C. resistance. This voltage is rectified by rectifier 21, which may conveniently be a germanium diode, and the average voltage corresponding thereto indicated on microammeter 22, typically having the range 0–50 microamperes. Resistor 23 (typically 3900 ohms) is a multiplier resistor for the attainment of a delivered network voltage within the range of microammeter 22, while rectifier 24, which may be a silicon junction diode, attenuates spike signals accompanying thyratron firing, so that they do not affect the meter indication. Under these circumstances, it will be understood that microammeter 22 measures the average voltage corresponding to the characteristic plasma-ion oscillations of interest, and the trend of this voltage with time is a reliable index of the proximity to failure of the thyratron tube under test.

In operation, the apparatus is connected to the operating thyratron by inserting pin jack 10 in the plug connected with the thyratron plate and pin jack 11 in the plug connected with the cathode of the thyratron, these connections, of course, being made while the thyratron is in service and without interference with its in-service operation. As is evident from FIG. 2, hereinafter described, the meter readings are a function of both the load resistance and the load voltage, therefore, the load resistance serviced by the thyratron should be known, at least approximately, for any given thyratron installation. This is usually no inconvenience, since thyratron selection is based on the resistance of the load serviced in any case.

Moreover, the thyratron should have been energized and brought to operating temperature for an appreciable period before any readings are taken in order to assure that stable operating conditions are attained. When pin jacks 10 and 11 are connected in circuit across the thyratron a reading may be taken on meter 22. As a final step, the voltage across the thyratron load resistance should be measured to enable one to select the applicable end-of-life meter reading from a plot such as that of FIG. 2, which relates the existing load resistance and voltage with meter readings. While the relationship of load resistance and voltage to meter readings is not entirely linear, the error incurred in interpolation is so small that it can be disregarded. When the meter reading reaches, or exceeds, the plotted values of FIG. 2, the thyratron should be replaced.

FIG. 2 is a nomogram portraying the correlation of the test of this invention for type 3C23 thyratrons with the peak arc drop test of the prior art. Experience with a very great number of type 3C23 thyratrons during long term service under known conditions has shown that, when the standard peak arc drop value has reached a nominal 25 volts, as determined, for example, on a General Electric Industrial Tube Analyzer, type YTW–3, the tube life can be considered essentially expended. The qualification "nominal" preceding the peak arc drop value cited is employed because peak arc drop measurements on a plurality of tubes of this type which are known to be near the end of their lives actually vary over a range which may extend from a lower limit of about 20 v. to an upper limit of about 30 v. Frequently, peak arc drop measurements are also quite non-reproducible, and this is another objection to their use in gauging tube life. Nevertheless, an average of a number of determinations fixes the safe replacement level at 25 volts for type 3C23 tubes, and this has been adhered to in keying this invention with the bulk of data accumulated in the past.

The nomogram of FIG. 2 was prepared by conducting a series of tests at 40 v. load voltage intervals on six thyratron tubes which had been utilized under different service conditions but all of which had freshly reached the nominal 25 volt replacement level as determined by the conventional peak arc drop test. These tubes were each subjected to the test of this invention as hereinbefore described using a commercially available test panel (e.g., a type VSR 2 amp. panel, Reliance Electric & Engineering Co.) for convenience in ready application of the appropriate resistive load. All of the tubes were tested at the same voltage and load resistances, and the results of the six tests were averaged to provide successive points through which the five load lines plotted were drawn. Use of the nomogram is demonstrated by the designation of the actual meter readings at which tube replacement should be had for tubes I and II, respectively, the two tubes whose entire lives are logged in FIG. 3. The load voltage range of 40 to 270 employed in FIG. 2 was merely for convenience and can, of course, be expanded or contracted to suit the particular requirements of the user.

Referring now to FIG. 3, the trend of instrument readings over substantially the entire lives of two 3C23 thyratrons will be described. The operating conditions for tube I were those usually encountered (i.e., 160 v. load voltage, 375 ohms load), while tube II was operated at below rated capacity (i.e., 60 v., 900 ohms), which is sometimes resorted to but is definitely abnormal. Both tubes initially gave a rather high reading on meter 22; however, successive readings show a steady decrease in plasma-ion oscillation until in the case of tube I at least, a more or less constant level was reach which persisted throughout the remaining safe life of the tube until there occurred the consistent rise which presages eventual failure. Tube II, operating below rated capacity, gave a considerably lower initial meter reading which, at 1000 hours, actually reached zero for the reasons hereinbefore mentioned. At 5000 hours it, too, showed a continuous rise with the passage of time. As hereinbefore explained with reference to FIG. 2 it is desirable to replace tube I at a meter reading of 25 microamperes and tube II at 11 microamperes; however, to explore the continuation of trend further several more readings were taken past the safe replacement level. Fortuitously, both tubes survived for the additional service involved; however, the safest practice is to schedule the thyratrons for replacement at the next routine machine shutdown following the arrival at the applicable safe levels.

I have found that meter readings taken at 500 operating-hour intervals after installation of a good thyratron suffice; however, when successive readings show a progressive increase in meter reading it is advisable to make subsequent readings at 100 hour intervals until the trend is clearly defined. If the meter readings increase during all later readings, replacement should be scheduled at a convenient routine machine shutdown. Replacement of the thyratron at the "end of life" level of FIG. 2 is recommended, but it will be understood that the remaining life of a given tube is indeterminate and that a tube might last a considerable time beyond this level, although there is no assurance that this will occur.

Sometimes the test readings for a given thyratron reveal a tendency to approach a line parallel to the ordinate axis asymptotically even before the safe replacement level determined from FIG. 2 is attained. Such a tube should be replaced as soon as conveniently possible as this is a particularly precarious situation from the standpoint of service reliability.

The apparatus hereinbefore described in detail is specifically intended for type 3C23 thyratrons. Other types of thyratron tubes each display characteristic plasma-ion oscillations the frequencies of which appear to be dependent upon the pressure of the vapor or gas filling and the mass of the positive ions therein. The design of apparatus of this invention adapted to use with any particular thyratron tube is identical with that hereinbefore described for the 3C23 type, except that inductance 20 has to be preselected to provide the selective band pass action required for the particular existing plasma-ion oscillation frequency. This selection is made on principles well known to those skilled in the art and constitutes no serious problem.

It will be understood that the apparatus and method of this invention are useful only for the anticipation of thyratron failure as a result of normal vitiation, and is not intended to signal the existence of "hot spots" which may develop on the cathode, breakage of filaments or other tube elements, or any other causes of abrupt failure. Nevertheless, this is no serious limitation on utility because, in the great majority of cases, thyratron failure is due to long term vitiation, and this invention affords a reliable anticipation of such failure without the necessity for taking the thyratron out of service for testing purposes.

It will be understood that this invention may be modified in numerous respects within the essential spirit of this invention, and, among these, that there are variations in the techniques of use, such as the employment of correction factors for thyratron operations at above normal filament voltages and temperatures, or the like, which are advantageous in specific circumstances. Accordingly, it is intended to be limited only within the scope of the attached claims.

What is claimed is:

1. The method of testing a thyratron tube during service operation comprising measuring the average plate-to-cathode voltage which corresponds substantially exclusively to the plasma-ion oscillations existing within said tube in the frequency range of about 100 kc./sec. to about 5 megacycles/sec. which voltage increases progressively with the vitiation of the cathode electron-emitting surface of said thyratron tube, and obtaining an indication of the remaining life of said thyratron tube as a function of the magnitude and trend upwards of said plate-to-cathode voltage.

2. The method of testing a thyratron tube according to claim 1 for a combination mercury vapor-xenon filled tube type wherein said plasma-ion oscillations are in the range of about 200±100 kcs./sec.

3. An apparatus for testing thyratron tubes during service operation comprising a passive network provided with a pair of leads, one of which is adapted to be connected to the plate element of said thyratron tube and the other of which is adapted to be connected to the cathode element of said thyratron tube, a parallel-resonant bandpass filter selective to voltages in the frequency range of plasma-ion oscillations within said thyratron tube which increase with vitiation of the cathode electron-emitting surface of said thyratron tube connected across said pair of leads, a first rectifier connected across said pair of leads past said band-pass filter and a meter for the measurement of the D.-C. voltage output of said rectifier connected in series with said rectifier across said pair of leads.

4. An apparatus for testing thyratron tubes during service operation according to claim 3 wherein said passive network is provided with a second rectifier connected in opposed relationship to said first rectifier across said pair of leads past said band-pass filter adapted to attenuate spike signals accompanying thyratron firing.

References Cited in the file of this patent
UNITED STATES PATENTS

| | | |
|---|---|---|
| 2,560,952 | Herold | July 17, 1951 |
| 2,935,684 | Lanning | May 3, 1960 |
| 2,941,149 | Rhodes | June 14, 1960 |